(12) United States Patent
Benson et al.

(10) Patent No.: US 10,878,113 B2
(45) Date of Patent: Dec. 29, 2020

(54) MULTIPLE MAILBOX SECURE CIRCUIT

(71) Applicant: Apple Inc., Cupertino, CA (US)

(72) Inventors: Wade Benson, San Jose, CA (US); Michael J. Smith, San Francisco, CA (US); Joshua P. de Cesare, Campbell, CA (US)

(73) Assignee: Apple Inc., Cupertino, CA (US)

( * ) Notice: Subject to any disclaimer, the term of this patent is extended or adjusted under 35 U.S.C. 154(b) by 117 days.

(21) Appl. No.: 16/144,176

(22) Filed: Sep. 27, 2018

(65) Prior Publication Data

US 2019/0188397 A1 Jun. 20, 2019

Related U.S. Application Data

(60) Provisional application No. 62/598,784, filed on Dec. 14, 2017.

(51) Int. Cl.

| | | |
|---|---|---|
| *G06F 21/62* | (2013.01) | |
| *G06F 21/12* | (2013.01) | |
| *G06F 21/57* | (2013.01) | |
| *G06F 21/74* | (2013.01) | |
| *G06F 21/60* | (2013.01) | |
| *G06F 21/72* | (2013.01) | |

(Continued)

(52) U.S. Cl.
CPC .......... *G06F 21/6209* (2013.01); *G06F 21/12* (2013.01); *G06F 21/575* (2013.01); *G06F 21/602* (2013.01); *G06F 21/6245* (2013.01); *G06F 21/72* (2013.01); *G06F 21/74* (2013.01); *G06F 21/78* (2013.01); *H04L 9/088* (2013.01); *G06F 21/81* (2013.01)

(58) Field of Classification Search
CPC .. G06F 21/6209; G06F 21/575; G06F 21/602; G06F 21/6245
USPC .............................. 713/2, 156, 164, 169, 172
See application file for complete search history.

(56) References Cited

U.S. PATENT DOCUMENTS 8,775,757 B2    7/2014  Polzin et al.
8,832,465 B2 *  9/2014  Gulati .................. G06F 21/575
                                                              713/192

(Continued)

OTHER PUBLICATIONS

"Demystifying the Secure Enclave Processor"—Mandt et al, Azimuth Security, Off Cell Research, Mar. 14, 2015 http://mista.nu/research/sep-paper.pdf (Year: 2015).*

(Continued)

*Primary Examiner* — Randy A Scott
(74) *Attorney, Agent, or Firm* — Kowert, Hood, Munyon, Rankin & Goetzel, P.C.

(57) ABSTRACT

Techniques are disclosed relating to data storage. In various embodiments, a computing device includes first and second processors and memory having stored therein a first encrypted operating system executable by the first processor and a second encrypted operating system executable by the second processor. The computing device also includes a secure circuit configured to receive, via a first mailbox mechanism of the secure circuit, a first request from the first processor for a first cryptographic key usable to decrypt the first operating system. The secure circuit is further configured to receive, via a second mailbox mechanism of the secure circuit, a second request from the second processor for a second cryptographic key usable to decrypt the second operating system, and to provide the first and second cryptographic keys.

19 Claims, 6 Drawing Sheets

(51) Int. Cl.
*G06F 21/78* (2013.01)
*H04L 9/08* (2006.01)
*G06F 21/81* (2013.01)

(56) References Cited

U.S. PATENT DOCUMENTS

| | | |
|---|---|---|
| 9,547,778 B1 | 1/2017 | Paaske et al. |
| 2011/0202916 A1* | 8/2011 | VoBa .................. G06F 9/45558 |
| | | 718/1 |
| 2014/0089682 A1 | 3/2014 | Gulati et al. |
| 2016/0055102 A1* | 2/2016 | de Cesare ............... G06F 21/00 |
| | | 713/193 |
| 2016/0261408 A1* | 9/2016 | Peddada ............... H04L 9/0861 |
| 2016/0364343 A1 | 12/2016 | Case et al. |
| 2017/0373843 A1 | 12/2017 | Benson et al. |
| 2018/0211049 A1* | 7/2018 | Kelso ................... H04L 9/3234 |

OTHER PUBLICATIONS

International Search Report and Written Opinion in Appl. No. PCT/US2018/063229 dated Feb. 13, 2019, 16 pages.
Face ID Security, Apple, Nov. 2017, 6 pages.
IOS Security—White Paper, iOS 10, Apple, Mar. 2017, 68 pages.

* cited by examiner

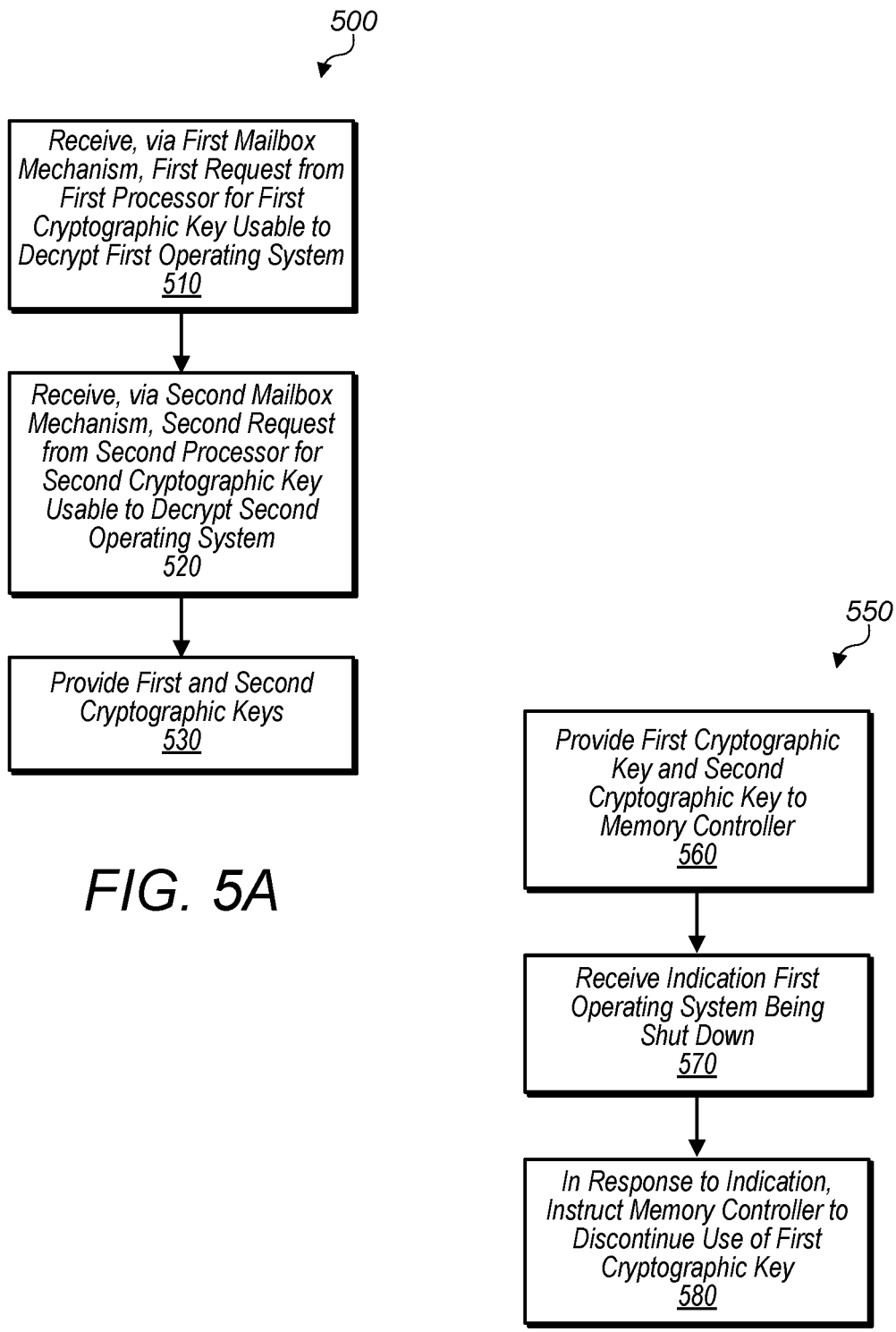

MULTIPLE MAILBOX SECURE CIRCUIT

This application claims the benefit of U.S. Prov. Appl. No. 62/598,784 filed on Dec. 14, 2017, which is incorporated by reference herein in its entirety.

BACKGROUND

Technical Field

This disclosure relates generally to computing devices, and, more specifically, to computing devices that support secure data storage.

Description of the Related Art

Computing devices may maintain various forms of confidential information, which may need to be protected. For example, a user's mobile phone might store personal information such as contact information of friends and family, photographs, text messages, email, etc. In some instances, a computing device may attempt to prevent access to this information by presenting a login screen that requires a user to provide a user name and password in order to obtain access to data stored therein. Accordingly, if a malicious person is unable to provide this information, this person may not be able to gain access. Still further, a computing device may employ encryption of stored information in order to prevent gaining access to data by some other means.

BRIEF DESCRIPTION OF THE DRAWINGS

FIGS. 5A and 5B are flow diagrams illustrating examples of methods for secure data storage.

Figure 1:
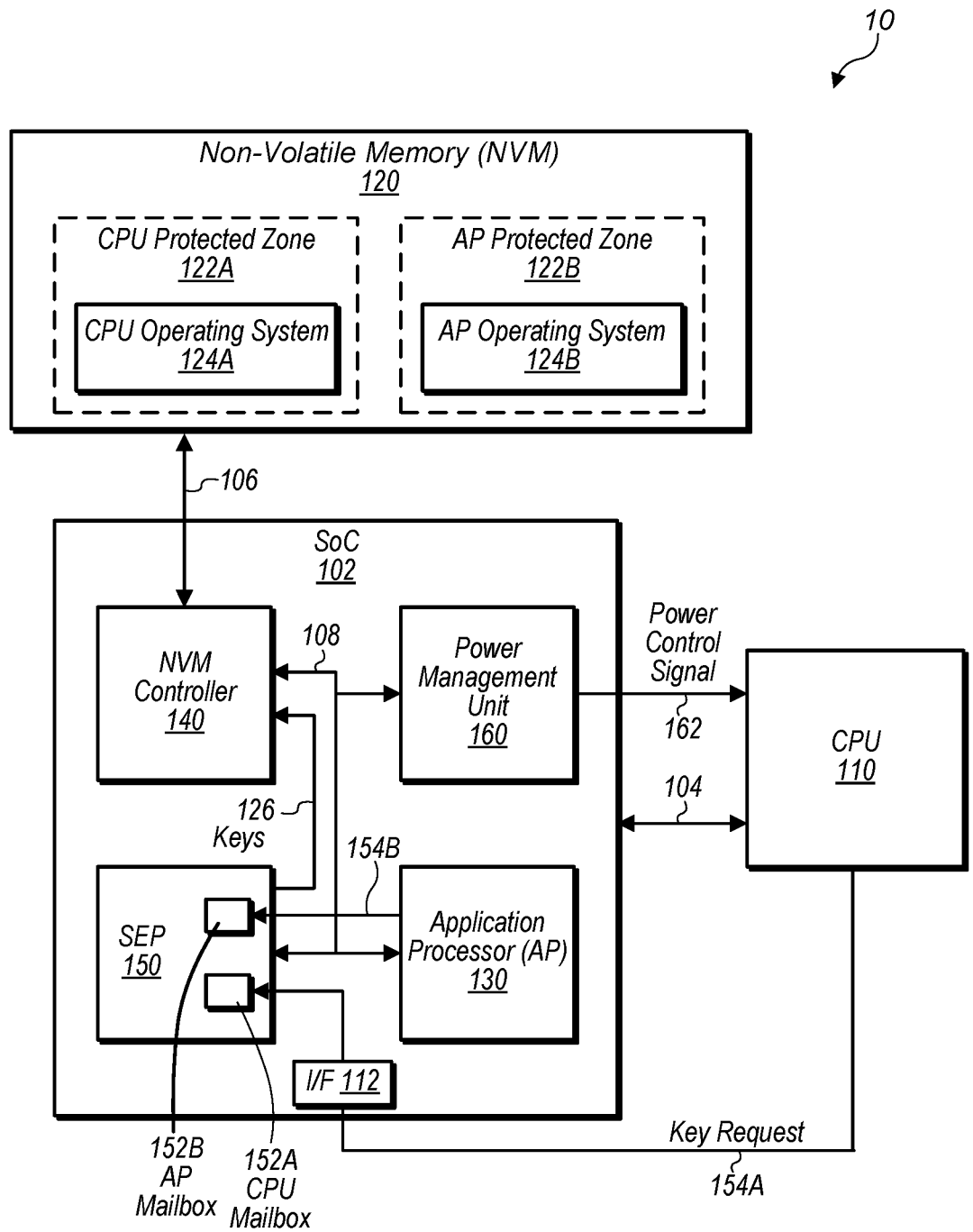
FIG. 1 is a block diagram illustrating an example of a computing device that implements secure data storage.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "interface configured to communicate with a first processor" is intended to cover, for example, circuitry that performs this function during operation, even if the circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having eight processing cores, the terms "first" and "second" processing cores can be used to refer to any two of the eight processing cores. In other words, the "first" and "second" processing cores are not limited to processing cores 0 and 1, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

The present disclosure describes embodiments in which a computing device may include a first processor and a second processor that access protected content stored in memory. In some embodiments, the first processor may be a general-purpose processor (e.g., a central processing unit CPU) that executes program instructions to perform operations for the computing device. In some embodiments, the second processor may execute program instructions to perform specific functions, which may pertain to system security. These functions may include, for example, authenticating a user, verifying integrity of software executing on the computing device, maintaining encrypted information in a non-volatile memory, providing various system services, etc. As will be described in greater detail below, content stored in memory for the first processor may be cryptographically separated from content stored for the second processor. That is, content of the first processor may be encrypted using a first set of one or more keys associated with the first processor while content of the second processor may be encrypted using a second set of one or more keys associated with the second processor.

In various embodiments, these encryption keys may be provided by a secure circuit (referred to below as a secure enclave processor (SEP)) to a memory controller configured to decrypt content retrieved from the memory. In some embodiments, these keys may be provided when the first and second processors want to access their respective portions such as during an operating system boot. As will be described below, the SEP may handle receiving requests from the first processor and the second processor using separate mailboxes—e.g., a first mailbox associated with the first processor and a second mailbox associated with the second processor. In some embodiments, if one of the processors is shut down (e.g., the first processor), the secure circuit may instruct to the memory controller to discontinue use of the keys that permit access to that processor's portion in order to prevent access when the processor shutdown. The memory controller, however, may continue to service requests from the other processor to access its portion while the processor is in a shutdown state. In some instances, using separate encrypted portions of memory and discontinuing use of a processor's keys once it is shut down may allow for greater system security (as well as allowing one processor to continue accessing memory when the other is not in use). Still further, in some instances, using separate mailboxes may provide greater security by preventing one processor from gaining access to another processor's protected memory portion.

Turning now to FIG. 1, a block diagram of a computing device 10 is depicted. In the illustrated embodiment, computing device 10 includes a system on a chip (SoC) 102, central processing unit (CPU) 110, non-volatile memory (NVM) 120 coupled together via interconnects 104 and 106. SoC 102 further includes application processor (AP) 130, NVM controller 140, secure enclave processor (SEP) 150, and power management unit (PMU) 160. In some embodiments, device 10 includes more (or less) components than shown. Components may also be arranged differently than shown. For example, PMU 160 may be external to SoC 102, device 10 may not include an SoC, etc.

CPU 110, in some embodiments, is a general-purpose processor configured to execute various software, which may access data stored in NVM 120, such as a CPU operating system 124A and one or more user applications. Accordingly, CPU 110 may include circuitry configured to execute instructions defined in an instruction set architecture implemented by the processor. CPU 110 may also include multiple processor cores to support concurrent execution of program instructions. These cores may also be superscalar, multithreaded, and/or operate on data stored in cache memories. Although depicted as a CPU, processor 110, in some embodiments, may be implemented using a processor other than a CPU such as a graphics processor unit (GPU), digital signal processor (DSP), application-specific integrated circuit (ASIC), field-programmable gate arrays (FPGA), etc.

In various embodiments, CPU 110 communicates via interconnect 104 with SoC 102, which includes an interface 112 for communicating over interconnect 104. Interface 112 may support any suitable bus protocol such as enhanced serial peripheral interface (eSPI) or peripheral component interconnect (PCI) express. In some embodiments, interconnect 104 may also be a combination of interconnects using multiple protocols. In various embodiments, CPU 110 may obtain access to NVM 120 by issuing read and write requests to SoC 102.

Non-volatile memory (NVM) 120, in some embodiments, is the primary non-volatile storage for computing device. In some embodiments, NVM 120 may include various forms of solid-state memory such as NAND flash memory, NOR flash memory, nano RAM (NRAM), magneto-resistive RAM (MRAM), phase change RAM (PRAM), etc. In other embodiments, NVM 120 may include hard disks, optical disks, etc. As shown, in various embodiments, NVM 120 includes a CPU protected zone/portion 122A and an AP protected zone/portion 122B. As discussed above and described below, CPU protected zone 122A may be cryptographically separated from AP protected zone 122B in order to prevent CPU 110 from accessing AP protected zone 122B and, in some embodiments, AP 130 from accessing CPU protected zone 122A. (In another embodiment, AP 130 is permitted to access both zones 122A and 122B, but CPU 110 can only access zone 112A.) In doing so, a malicious actor who, for example, has compromised CPU OS 124A (or other program instructions executing CPU 110) may be prevented from compromising AP protected zone 122B. An example of how cryptographic separation is implemented is discussed below with respect to FIG. 2. As shown, in some embodiments, CPU protected zone 122A may include program instructions for CPU operating system (OS) 124A, which is executed by CPU 110 and may be the main operating system for device 10. As also shown, AP protected zone 122A may include program instructions for AP operating system (OS) 124B, which is executed by AP 130 and may be an application-specific operating system.

Application processor (AP) 130, in some embodiments, is a processor configured to execute program instructions to perform various specific functions, which may be distinct from those of CPU 110. As noted above, these functions may include, for example, authenticating a user, verifying the integrity of CPU OS 124A, facilitating access to NVM 120, managing a touch bar, etc. In some embodiments, AP 130 is also implemented using a CPU of SoC 102. (Accordingly, the phrase "application processor" is merely used herein as a label to differentiate processor 130 from processor 110.) Similar to CPU 110, in some embodiments, AP 130 may be implemented using other forms of processors such as those noted above.

NVM controller 140, in various embodiments, is configured facilitate access to NVM 120 by CPU 110 and components of SoC 102 such as AP 130. Accordingly, memory controller 140 may include a memory management unit (MMU) configured to implement a virtual memory and/or a memory physical interface (PHY) configured to directly interface with NVM 120. In various embodiments, memory controller 140 also includes a cryptographic engine configured to encrypt data being stored in NVM 120 and decrypt data being read from NVM 120. As will be discussed below, in some embodiments, memory controller 140 may perform encryption and decryption using keys 126 supplied by SEP 150.

Secure enclave processor (SEP) 150, in various embodiments, is a secure circuit configured to perform cryptographic services such as providing keys 126 to NVM controller 140 to decrypt and encrypt data from NVM 120. As used herein, the term "secure circuit" refers to one of a class of circuits that is configured to perform one or more services and return an authenticated response to an external requester. A result returned by a secure circuit is considered to have indicia of trust exceeding that of a circuit that merely returns a result without any form of authentication. In some embodiments, responses from SEP 150 are authenticated through the use of cryptography such as providing a digital signature or encrypted data. In some embodiments, responses from SEP 150 are authenticated by being communicated through a trusted commination channel such as a dedicated bus between SEP 150 and the other party or a mailbox mechanism discussed below. For example, in various embodiments, SEP 150 and NVM controller 140 communicate via secure channel established using shared cryptographic keys. In contrast, a circuit such as a hardware accelerator that merely operates on some received value and returns a result would not be considered a secure circuit within the meaning of this application. By authenticating results that are returned, such as by signing with a verifiable digital signature, a secure circuit may thus provide anti-spoofing functionality. Additionally, in some cases, a secure circuit may be said to be "tamper-resistant," which is a term of art referring to mechanisms that prevent compromise of the portions of the secure circuit that perform the one or more services.

In various embodiments, SEP 150 provides keys 126 for accessing protected zones 122 in responsive to key requests 154A and 154B received via mailbox mechanisms 152A and 152B (or simply "mailboxes"). As used herein, a "mailbox mechanism" refers to a memory circuit that temporarily stores 1) an input for a secure circuit until it can be retrieved by the circuit and/or 2) an output of a secure circuit until it can be retrieved by an external circuit. In various embodiments, CPU mailbox 152A is associated with CPU 110 such that mailbox 152A is configured to receive key requests 154A from CPU 110 via interface 112, but not receive requests 154B from AP 130. Similarly, AP mailbox 152B may be associated with AP 130 (or more generally SoC 102) such that AP mailbox 152B is configured to receive key requests 154B from AP 130 (or more generally requests from components within SoC 102), but not requests 154A from CPU 110. In some embodiments, enforcement of these associations may be implemented via a filter circuit discussed below with respect to FIG. 4. As noted above, in some embodiments, using multiple mailboxes 152 in this manner may provide greater security against CPU 110 accessing access AP protected zone 122B (and AP 130 accessing CPU protected zone 122A in some embodiments). In various embodiments, CPU 110 and AP 130 may issue key requests 154 to cause SEP 150 to provide keys 126 to NVM controller 140 when CPU 110 and AP 130 want to access encrypted content in NVM 120 such as accessing files of CPU OS 124 and AP OS 124B during their respect boot processes.

As discussed below with respect to FIG. 3A, in various embodiments, keys 126 are stored in an encrypted form in NVM 120. When SEP 150 receives a key request associated with a particular key 126, SEP 150 may retrieve the encrypted copy from NVM 120 and decrypt using an internally stored unlock key. SEP 150 may then provide this decrypted key to NVM controller 140 over a secure channel in order to enable NVM controller 140 to begin decrypting data with that key 126. In some embodiments, the unlock keys used to decrypt keys 126 may be derived by SEP 150 or come from a key bag stored in NVM 120, which is encrypted by yet another unlock key. SEP 150 may use any suitable scheme for deriving these unlock keys. In one embodiment, SEP 150 derives these unlock keys 126 by performing a key derivation function (KDF) based on a user's password/passcode. In some embodiments, the KDF is further based on a unique identifier associated with computing device 10. In some embodiments, the unique identifier uniquely identifies device 10 from other similar devices 10. In other embodiments, a unique identifier for SoC 102 is used (along with a user's passcode) to derive an unlock key for keys 126 associated with AP protected zone 122B. Another unique identifier for CPU 110 is used (along with a user's passcode) to derive an unlock key for keys 126 associated with CPU protected zone 122A. In some embodiments, SEP 150 may permit use of unlock key 312 in response to a successful biometric authentication of the user such as discussed below with respect to FIG. 4.

As will be described below with respect to FIG. 3B, in various embodiments, SEP 150 may discard unlock keys for one of zones 122 and instruct NVM controller 140 to do the same for keys 126 in response to receiving an indication that CPU 110 or AP 130 is being shut down (or being placed in a reduced power state). For example, if a user has selected a shutdown option in a menu of CPU OS 124A, CPU 110 may begin a shutdown procedure. Once complete, SEP 150 may receive an indication of the shutdown and instruct NVM controller 140 discontinue the use of keys 126 associated with CPU zone 122A. NVM controller, however, may continue to service requests from AP 130 using keys 126 for AP protected zone 122. In some embodiments, SEP 150 determines when CPU 110 is being shut down based on an indication received from power management unit 160.

Power management unit (PMU) 160, in some embodiments, is configured to manage/control power supplied to one or more of components of computing device 10. Accordingly, in the illustrated embodiment, PMU 160 controls power for CPU 110 via a power control signal 162. In some embodiments, this signal may control one or more clock gates to gate a clock signal provided by CPU 110 and/or control one or more power gate to gate a power signal supplied to CPU 110. In other embodiments, other techniques may be used to manage power. In some embodiments, PMU 160 may be coupled to a power button for device 10 and configured to initiate a boot sequence for OSs 124A of computing device 10 responsive to the button being pressed. In some embodiment, PMU 160 may perform additional functions such as managing a battery powering device 10, thermal management including enabling one or more fans to dissipate heat, responding to a display lid opening or closing (e.g., if computing device 10 is a notebook), enabling keyboard backlighting, etc. In some embodiments, PMU 160 may be more generally referred to as a system management controller (SMC).

Figure 2:
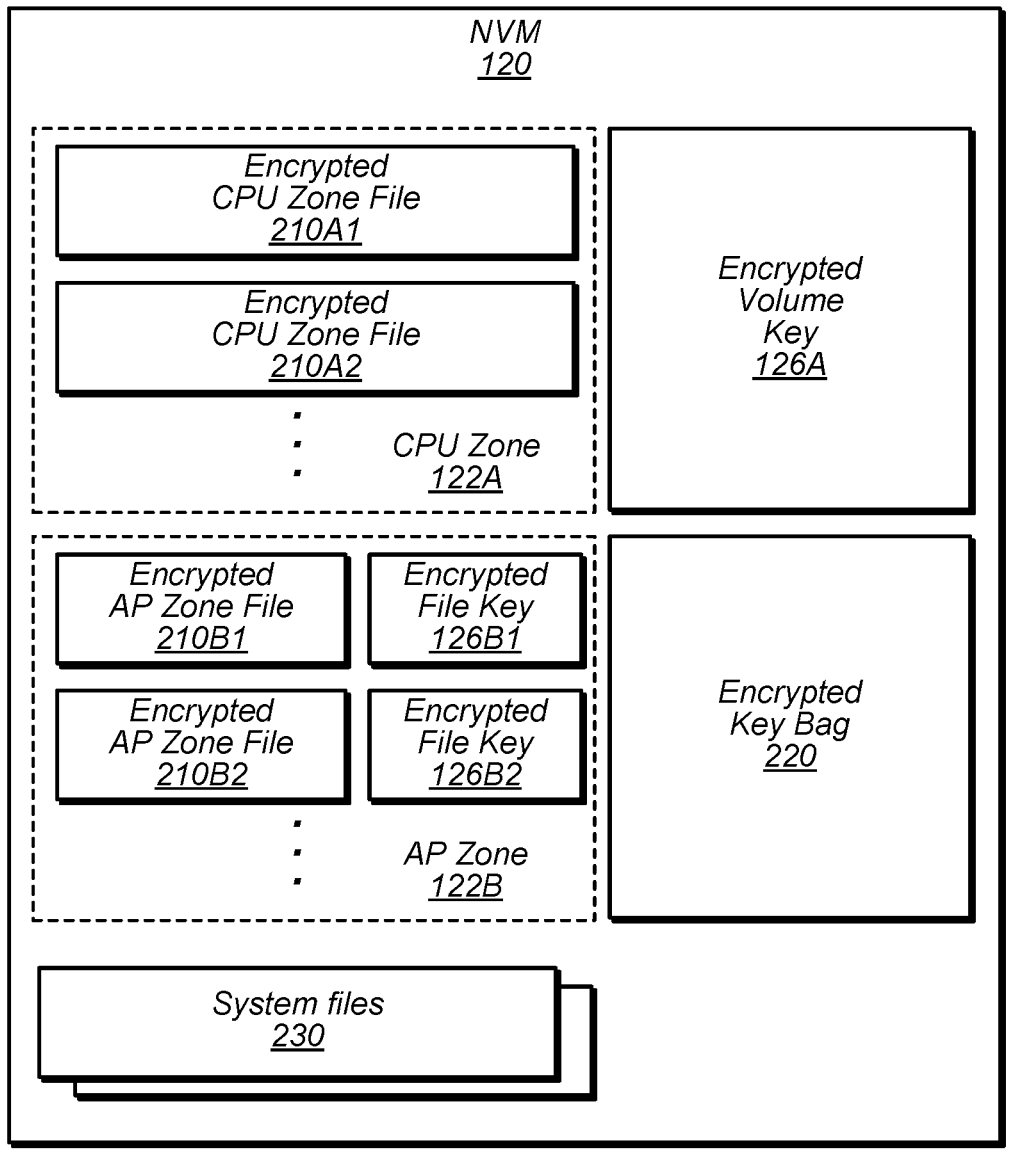
FIG. 2 is a block diagram illustrating an example of data being securely stored in a non-volatile memory.

Turning now to FIG. 2, a block diagram of protected contents of NVM 120 is depicted. As discussed above, NVM 120 may include a CPU zone 122A and an AP zone 122B. In the illustrated embodiment, zone 122A may have encrypted CPU zone files 210A; AP zone 122B may have encrypted AP zone files 210B and encrypted file keys 126B. As shown, NVM 120 may also include an encrypted volume key 126, an encrypted key bag 220, and system files 230. In some embodiments, the contents in NVM 120 may be organized in a different manner than shown.

In the illustrated embodiment, CPU zone 122A is a volume/partition that is encrypted using a single volume key 126A. Accordingly, to gain access to file 210A1, SEP 150 may derive an unlock key to decrypt encrypted volume key 126A and provide the key 126A to NVM controller 140 to decrypt file 210A1. In some embodiments, SEP 150 may decrypt encrypted volume key 126A during a boot process of CPU OS 124A in response to a request 154A from CPU 110. In some embodiments, CPU zone 122A may include multiple volumes and thus multiple volume keys. In other embodiments, a different encryption scheme may be used.

In contrast, AP files 210B, in the illustrated embodiment, are encrypted using respective file keys 126B. These file keys 126B are then encrypted with unlock keys in encrypted key bag 220, which is, in turn, encrypted using another unlock key derived by SEP 150. Accordingly, to access file 210B1, SEP 150 decrypts key bag 220 to get an unlock key and then decrypts file key 126B1 with the unlock key. File key 126B1 is then provided to NVM controller 140, which decrypts file 210B1 when it is read from NVM 120. In some embodiment, SEP 150 decrypts encrypted key bag 220 in conjunction with a boot process of AP OS 124B. SEP 150 may, however, decrypt file keys 126B as requested by AP 130 via requests 154B. In other embodiments, other encryption schemes may be employed. For example, AP zone 122B may use the same scheme as CPU zone 122B (as opposed to using a different, more stringent scheme as shown in FIG. 2).

In various embodiments, system files 230 are files that are not encrypted by a corresponding key 126. These files 230, for example, may include program instructions that are initially executed by processors 110 and 130 to cause them to subsequently issue requests 154. For example, these instructions may include instructions for boot loaders (e.g., EFI code), etc.

Figure 3A:
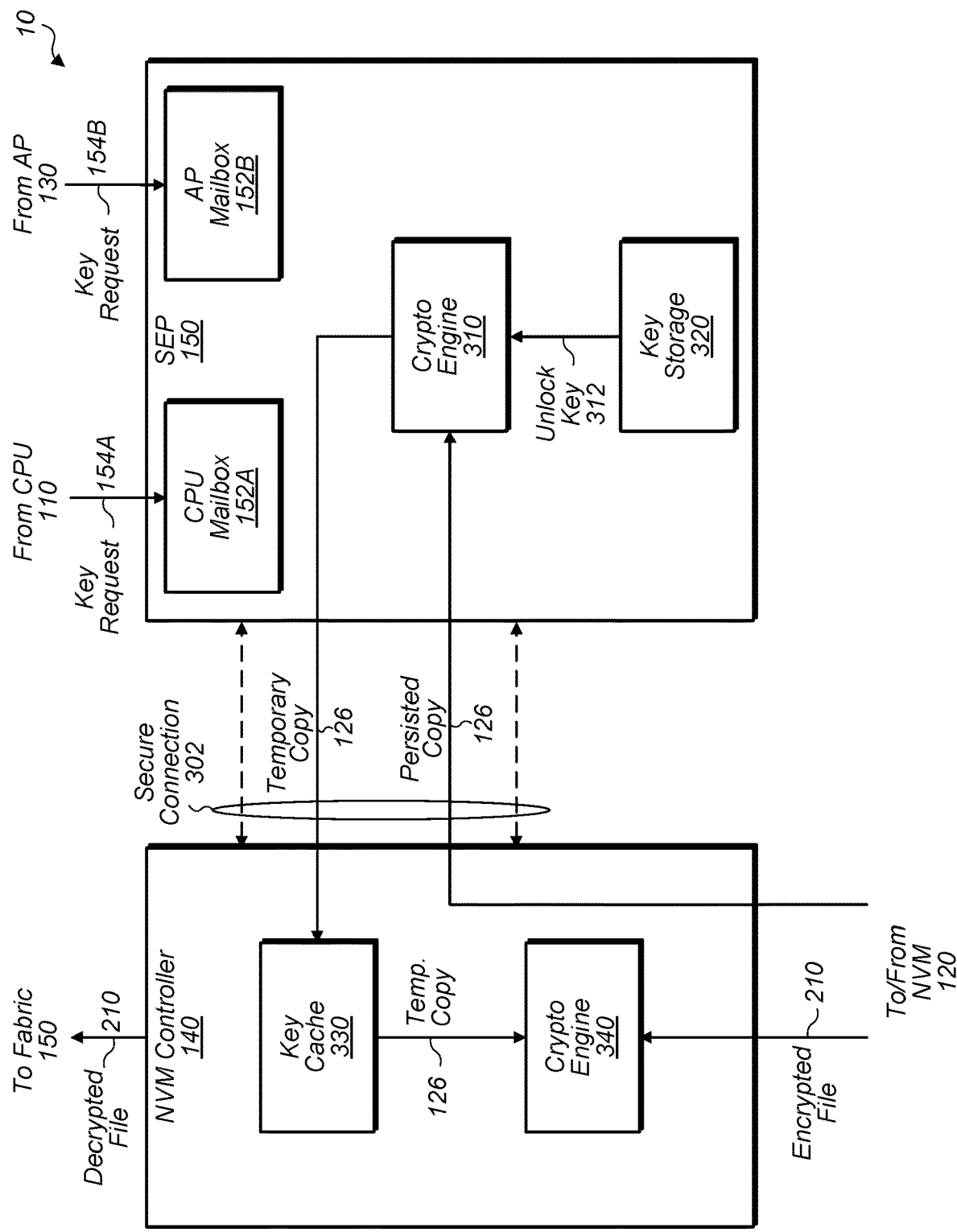
FIGS. 3A and 3B are block diagrams illustrating exemplary exchanges between a memory controller for the non-volatile memory and a secure enclave processor of the computing device.

Turning now to FIG. 3A, a block diagram of an exchange between NVM controller 140 and SEP 150 to decrypt keys 126 is depicted. In illustrated embodiment, SEP 150 includes mailboxes 152, crypto engine 310, and key storage 320. NVM controller 140 includes a key cache and another crypto engine 340.

Cryptographic engine 310, in various embodiments, is circuitry configured to perform cryptographic operations for SEP 150. Cryptographic engine 310 may implement any suitable encryption algorithm such as DES, AES, RSA, etc. As shown, SEP 150 may receive a key request 154 via one of mailboxes 152. In response, NVM controller 140 may read the encrypted version of the corresponding key 126 (shown as the persisted copy 126) from NVM 120 and provide the key over secure connection 302. Crypto engine 310 may decrypt the key 126 using an unlock key 312 from key storage 320. As noted above, in some embodiments, this key 312 may be derived based on a user's passcode and a unique identifier associated with the requester (CPU 110 or AP 130). Once key 126 is decrypted, SEP 150 provides a temporary copy of the key 126 via secure connection 302 to NVM controller 140. In some embodiments, secure connection 302 is implemented using a cryptographic key shared between SEP 150 and NVM controller 140. In other embodiments, secure connection 302 is a dedicated line between SEP 150 and NVM controller 140.

Key cache 330, in one embodiment, is a memory configured to store temporary copies of keys 126 received from SEP 150. Cryptographic engine 340 (which may be implemented in a similar manner as engine 310) may periodically retrieve keys 126 from cache 330 as warranted in order to decrypt files 210. For example, if NVM controller 140 is reading an encrypted CPU zone file 210A, engine 340 may read a temporary copy of volume key 126A to decrypt the file 210A before providing it to CPU 110. As will be discuss below with respect to FIG. 3B, SEP 150 may instruct NVM 140 to remove keys 126, such as volume key 126A, in order to disable accessing files in a particular zone 122.

Figure 3B:
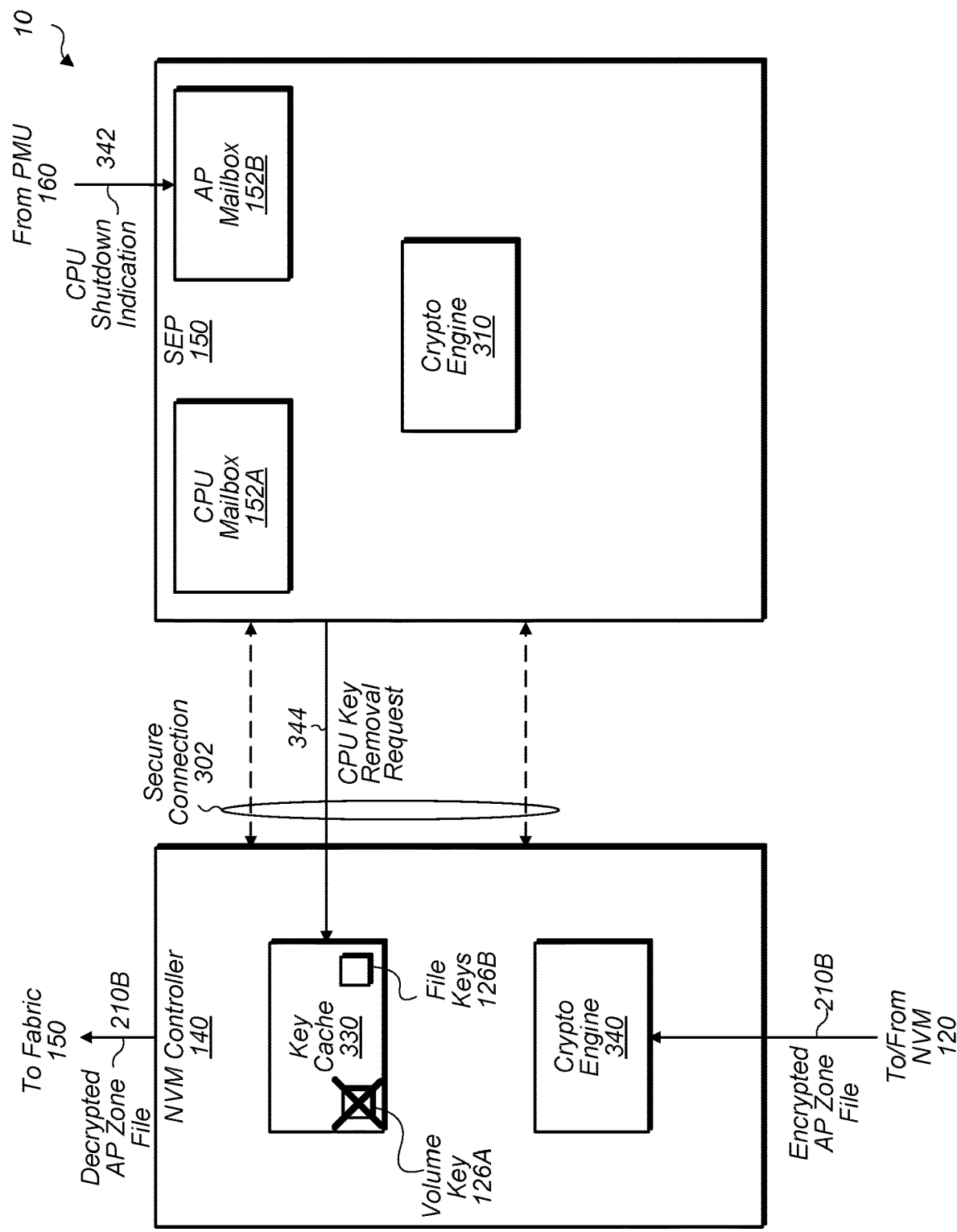

Turning now to FIG. 3B, a block diagram of an exchange between NVM controller 140 and SEP 150 to remove keys 126 is depicted. As shown, in some embodiments, SEP 150 receives CPU shutdown indication 342 from PMU 160 via AP mailbox 152B. As noted above, this indication 342 may be issued by PMU 160 in response to CPU OS 124A being shut down and PMU 160 placing CPU 110 into a lower power state. In response to receiving indication 342, SEP 150 issues a corresponding CPU key removal request 344 to key cache 330 to cause it to remove any keys 126 being used to access CPU zone 122A—e.g., volume key 126A in the illustrated embodiment. At this point, accessing CPU zone 122A may be prevented as no cryptographic keys 126 are available to decrypt zone 122A. In various embodiments, however, NVM controller 140 may continue to service requests for files 210B from AP zone 122B as file keys 126B may still be available in cache 330. In other words, CPU zone 122A is protected while AP zone 122B is still accessible. Thus, AP 130 may be able to perform various functions while CPU 110 is in a lower-power or powered-off state.

Figure 4:
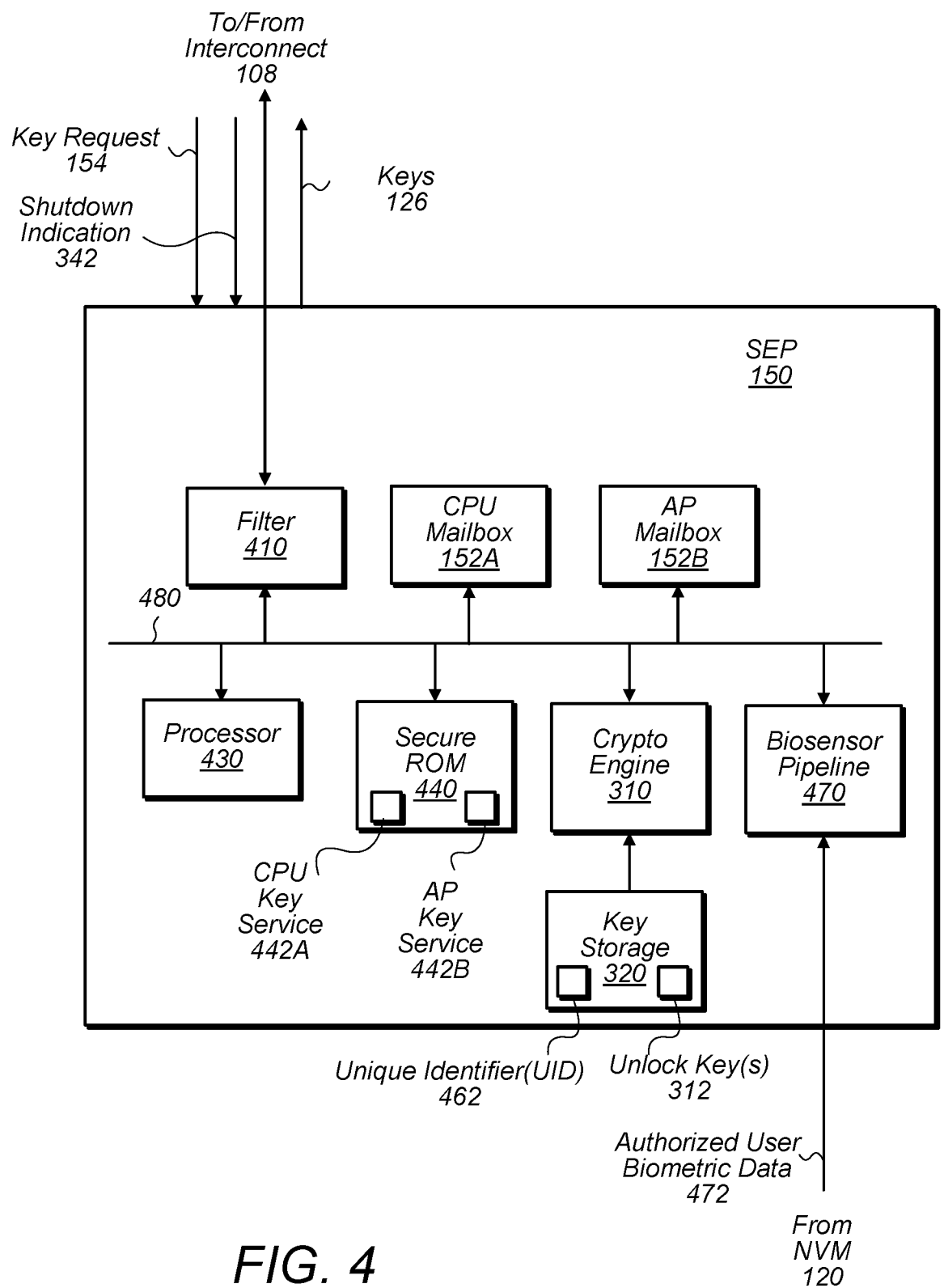
FIG. 4 is a block diagram illustrating an example of the secure enclave processor in the computing device.

Turning now to FIG. 4, a block diagram of SEP 150 is depicted. In the illustrated embodiment, SEP 150 includes a filter 410, secure mailboxes 152A and 152B, processor 430, secure ROM 440, cryptographic engine 310, a key storage 320, and a biosensor pipeline 470 coupled together via an interconnect 480. In some embodiments, SEP 150 may include more (or less) components than shown in FIG. 4. As noted above, SEP 150 is a secure circuit having tamper resistance. As discussed below, SEP 150 implements tamper resistance through the use of filter 410 and secure mailboxes 152. (In some embodiments, interface 112 may include a filter and/or a mailbox mechanism in order to make SoC 102 a secure circuit.)

Filter 410 is circuitry configured to tightly control access to SEP 150 to increase the isolation of the SEP 150 from the rest of the SoC 102 (as well as computing device 10), and thus the overall security of the device 10. More particularly, in one embodiment, filter 410 may permit read/write operations from CPU 110 and AP 130 (or other peripherals coupled to interconnect 108) to enter SEP 150 only if the operations address CPU mailbox 152A and AP mailbox 152B, respectively. Other operations may not progress from the interconnect 108 into SEP 150. Even more particularly, filter 410 may permit write operations to the address assigned to the inbox portion of a mailbox 152, and read operations to the address assigned to the outbox portion of the mailbox 152. All other read/write operations may be prevented/filtered by the filter 410. In some embodiments, filter 410 may respond to other read/write operations with an error. In one embodiment, filter 410 may sink write data associated with a filtered write operation without passing the write data on to local interconnect 480. In one embodiment, filter 410 may supply nonce data as read data for a filtered read operation. Nonce data (e.g., "garbage data") may generally be data that is not associated with the addressed resource within the SEP 150. Filter 410 may supply any data as nonce data (e.g. all zeros, all ones, random data from a random number generator, data programmed into filter 410 to respond as read data, the address of the read transaction, etc.).

In various embodiments, filter 410 may only filter incoming read/write operations. Thus, the components of the SEP 150 may have full access to the other components of SoC 102 (as well as device 10) including AP 130, NVM controller 140, PMU 160, and/or a biosensor (not shown and discussed below). Accordingly, filter 410 may not filter responses from interconnect 108 that are provided in response to read/write operations issued by SEP 150.

Mailboxes 152 are circuitry that, in some embodiments, includes an inbox and an outbox. Both the inbox and the outbox may be first-in, first-out buffers (FIFOs) for data. The buffers may have any size (e.g. any number of entries, where each entry is capable of storing data from a read/write operation). Particularly, the inbox may be configured to store write data from write operations sourced from CPU 110 or AP 130. The outbox may store write data from write operations sourced by processor 430. In some embodiments, software executing on CPU 110 or AP 130 may request services of SEP 150 via an application programming interface (API) supported by operating systems 124A or 124B—i.e., a requester may make API calls that request services of SEP 150. These calls may cause corresponding requests to be written to mailboxes 152, which are then retrieved from mailboxes 152 and analyzed by processor 430 to determine whether it should service the requests. Accordingly, this API may be used to requests 154 for keys 126 as discussed above via mailboxes 152. By isolating SEP 150 in this manner, integrity of SEP 150 may be enhanced.

SEP processor 430 is configured to process commands received from various sources in computing device 10 and may use various secure peripherals to accomplish the commands. Processor 430 may then execute instructions stored in ROM 440 such as CPU key service 442A and AP key service 442B. For example, SEP processor 430 may execute CPU key service 442A to service key requests 154A received via CPU mailbox 152A and AP key service 442B to service key requests 154B received via AP mailbox 152B. These services 442 may then interact with memory controller 140 to retrieve the appropriate keys 126 and crypto engine 310 to decrypt and provide the keys 126. In some embodiments, services 442 may include encrypted program instructions loaded from a trusted zone in memory 120 such as AP Zone 122B. In some embodiments, program instructions executed by SEP processor 430 are signed by a trusted authority (e.g., device 10's manufacturer) in order to ensure their integrity.

Secure ROM 440 is a memory configured to store program instruction for booting SEP 150. In some embodiments, ROM 440 may respond to only a specific address range assigned to secure ROM 440 on local interconnect 480. The address range may be hardwired, and processor 430 may be hardwired to fetch from the address range at boot in order to boot from secure ROM 440. Filter 410 may filter addresses within the address range assigned to secure ROM 440 (as mentioned above), preventing access to secure ROM 440 from components external to the SEP 150. In some embodiments, secure ROM 440 may include other software executed by SEP processor 430 during use. This software may include the program instructions to process inbox messages and generate outbox messages, etc.

Cryptographic engine 310 is circuitry configured to perform cryptographic operations for SEP 150, including key generation as well as encryption and decryption using keys in key storage 320. Cryptographic engine 310 may implement any suitable encryption algorithm such as DES, AES, RSA, etc. In some embodiments, engine 310 may further implement elliptic curve cryptography (ECC). In various embodiments, engine 310 is responsible for deriving unlock keys 312 used to decrypt keys 126. In some embodiments, these keys 312 may be derived from a user's password/passcode and/or a unique identifier (UID) 462 in storage 320. As noted above, in some embodiments, UID 462 may be a value that uniquely identifies device 10 (among other devices 10). In other embodiments, UIDs 462 may include a first UID that uniquely identifies CPU 110 and is usable to derive an unlock key 312 for volume key 126A and a second UID that uniquely identifies AP 130 and is usable to device an unlock key 312 for decrypting key bag 220. In various embodiments, engine 310 also encrypts traffic for secure connection 302.

Key storage 320 is a local memory (i.e., internal memory) configured to store cryptograph keys such as unlock keys 312 and UIDs 462. In some embodiments, these keys may also include keys used to establish the secure channels between SEP 150 and other elements such as memory controller 140. In some embodiments, storage 320 may include a fused memory that stores information by blowing one or more fuses to encode data, such as UIDs 462. In some embodiments, information may be stored in the fused memory by the manufacturer during fabrication of device 10.

Biosensor sensor pipeline 470, in one embodiment, is circuitry configured to authenticate a user of device 10 by comparing biometric data captured by a biosensor with biometric data 372 of an authorized user. This biometric data is data that uniquely identifies the user among other humans (at least to a high degree of accuracy) based on the user's physical or behavioral characteristics. For example, in some embodiments, the biosensor is a finger print sensor that captures fingerprint data from the user. In other embodiments, the biosensor is a facial recognition scanner. Accordingly, as shown, pipeline 470 may be configured to read, from memory 120, biometric data 472 of an authorized user, which may be protected by encryption in some embodiments or being stored in an associated part of memory 120 that is only accessible to SEP 150. (In another embodiment, SEP 150 may store data 472 internally.) Based on the comparison of biometric data collected by the biosensor and biometric data 472, SEP 150 may provide an authentication result indicating whether the authentication was successful or failed.

Turning now to FIG. 5A, a flow diagram of a method 500 is depicted. Method 500 is one embodiment of a method performed by a computing device having a secure circuit such as computing device 10. In some instances, performance of method 500 may improve the security of computing device 10.

In step 510, a secure circuit (e.g., SEP 150) receives, via a first mailbox mechanism (e.g. CPU mailbox 152A) of the secure circuit, a first request (e.g., a key request 154A) from a first processor (e.g., CPU 110) for a first cryptographic key (e.g., volume key 126A) usable to decrypt a first operating system (e.g., CPU OS 124A). In some embodiments, the secure circuit, in response to the first request, performs a key derivation function to derive a cryptographic key (e.g., an unlock key 312) and decrypts, using the derived cryptographic key, an encrypted version of the first cryptographic key stored in memory. In one embodiment, the key derivation function is based on a passcode associated with a user of the computing device. In one embodiment, the key derivation function is based on a unique identifier (e.g., UID 462) stored in a fused memory (e.g., key storage 320) of computing device. In some embodiments, the first cryptographic key is usable to decrypt an entire volume of the memory, the volume including the first encrypted operating system.

In step 520, the secure circuit receives, via a second mailbox mechanism (e.g., AP mailbox 152B) of the secure circuit, a second request (e.g., request 154B) from the second processor (e.g., AP 130) for a second cryptographic key usable to decrypt a second operating system (e.g., AP OS 124B). In some embodiments, the second cryptographic key is usable to decrypt a single file (e.g., a file 210B) of the second encrypted operating system. In some embodiments, the secure circuit includes a third processor (e.g., processor 430) and memory having a first application (e.g. CPU key service 442A) and a second application (e.g., AP key service 442B) stored therein. In such an embodiment, the first application is executable by the third processor to service requests received via the first mailbox mechanism, including causing the secure circuit to provide the first cryptographic key responsive to the first request. The second application is executable by the third processor to service requests received via the second mailbox mechanism, including causing the secure circuit to provide the second cryptographic key responsive to the second request.

In step 530, the secure circuit provides the first and second cryptographic keys. In some embodiments, memory controller, having a cryptographic circuit (e.g., crypto engine 340), receives the first and second cryptographic keys from the secure circuit and reads the first and second encrypted operating systems from the memory. The memory controller also decrypts, via the cryptographic circuit, the first encrypted operating system with the first cryptographic key and decrypts, via the cryptographic circuit, the second encrypted operating system with the second cryptographic key. In some embodiments, the secure circuit provides the first cryptographic key in conjunction with the first processor booting the first operating system and provides the second cryptographic key in conjunction with the second processor booting the second operating system.

In some embodiments, method 500 further includes a power management circuit (e.g., PMU 160) controlling power supplied to the first processor (e.g., via a power control signal 162). In such an embodiment, the secure circuit receives, from the power management circuit, an indication (e.g., shutdown indication 342) that the first processor is being shut down. In response to the received indication, the secure circuit instructs (e.g., via a key removal request 344) the memory controller to discontinue use of the first cryptographic key.

Turning now to FIG. 5B, a flow diagram of a method 550 is depicted. Method 550 is one embodiment of a method performed by a secure circuit in a computing device having first and second processors such as computing device 10. In some instances, performance of method 500 may improve the security of computing device 10.

Method 550 begins in step 560 with a secure circuit (e.g., SEP 150) of a computing device providing a first cryptographic key (e.g., volume key 126A) and a second cryptographic key (e.g., a file key 126B) to a memory controller (e.g., controller 140). In various embodiments, the first cryptographic key is usable by the memory controller to decrypt a first operating system (e.g., OS 124A) executable by a first processor (e.g., CPU 110) of the computing device. The second cryptographic key is usable by the memory controller to decrypt a second operating system (e.g., OS 124B) executable by a second processor (e.g., AP 130) of the computing device. In step 570, the secure circuit receives an indication (e.g., CPU shutdown indication 342) that the first operating system being shut down. In step 580, in response to the indication, the secure circuit instructs the memory controller to discontinue use of the first cryptographic key (e.g., via a key removal request 344). In various embodiments, the memory controller is configured to use the second cryptographic key while the first operating system is shut down. In some embodiments, the secure circuit receives, via a first mailbox mechanism (e.g., CPU mailbox 152A) of the secure circuit, a first request (e.g., request 154A) from the first processor for the first cryptographic key and receives, via a second mailbox mechanism (e.g., AP mailbox 152B) of the secure circuit, a second request (e.g., request 154B) from the second processor for the second cryptographic key. In some embodiments, the first request is received in conjunction with a boot process of the first operating system. In some embodiments, method 550 further includes the secure circuit reading an encrypted version of the first cryptographic key from a memory (e.g., NVM 120) of the computing device, deriving a decryption key (e.g., an unlock key 312) based on a passcode supplied by a user, and the secure circuit decrypting the encrypted version of the first cryptographic key with the decryption key to provide the first cryptographic key to the memory controller.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A computing device, comprising:
   first and second processors;
   memory having stored therein a first encrypted operating system executable by the first processor and a second encrypted operating system executable by the second processor; and
   a secure circuit including a first mailbox mechanism for communicating with the first processor and a second mailbox mechanism for communicating with the second processor, wherein the secure circuit configured to:
      receive, through the first mailbox mechanism and from the first processor, a first request for a first cryptographic key usable to decrypt the first operating system;
      receive, through the second mailbox mechanism and from the second processor, a second request for a second cryptographic key usable to decrypt the second operating system; and
      provide the first and second cryptographic keys; and
   a cryptographic circuit configured to decrypt the first and second operating systems with the provided first and second cryptographic keys.

2. The computing device of claim 1, further comprising:
   a memory controller having the cryptographic circuit, wherein the memory controller is configured to:
      receive the first and second cryptographic keys from the secure circuit;
      read the first and second encrypted operating systems from the memory;
      decrypt, via the cryptographic circuit, the first encrypted operating system with the first cryptographic key; and
      decrypt, via the cryptographic circuit, the second encrypted operating system with the second cryptographic key.

3. The computing device of claim 2, wherein the secure circuit is configured to:

provide the first cryptographic key in conjunction with the first processor booting the first operating system; and
provide the second cryptographic key in conjunction with the second processor booting the second operating system.

4. The computing device of claim 2, further comprising:
a power management circuit configured to control power supplied to the first processor; and
wherein the secure circuit is configured to:
receive, from the power management circuit, an indication that the first processor is being shutdown; and
in response to the received indication, instruct the memory controller to discontinue use of the first cryptographic key.

5. The computing device of claim 4, further comprising:
a system on a chip (SoC) that includes the second processor, the secure circuit, and the power management circuit.

6. The computing device of claim 5, wherein the first processor is external to the SoC.

7. The computing device of claim 1, wherein the secure circuit is configured to:
in response to the first request:
perform a key derivation function to derive a cryptographic key; and
decrypt, using the derived cryptographic key, an encrypted version of the first cryptographic key stored in the memory.

8. The computing device of claim 7, wherein the key derivation function is based on a passcode associated with a user of the computing device.

9. The computing device of claim 7, wherein the key derivation function is based on a unique identifier stored in a fused memory of computing device.

10. The computing device of claim 1, wherein the first cryptographic key is usable to decrypt an entire volume of the memory, wherein the volume includes the first encrypted operating system.

11. The computing device of claim 10, wherein the second cryptographic key is usable to decrypt a single file of the second encrypted operating system.

12. An integrated circuit, comprising:
an interface configured to communicate with a first processor;
a second processor;
a secure circuit having a first mailbox mechanism usable to communicate with the first processor and a second mailbox mechanism usable to communicate with the second processor; and
a memory controller configured to access a memory having a first encrypted portion including a first operating system of the first processor and a second encrypted portion including a second operating system of the second processor;
a cryptographic circuit configured to decrypt the first and second portions; and
wherein the secure circuit is configured to:
receive, via the first mailbox mechanism, a first request from the first processor for a first cryptographic key usable to decrypt the first encrypted portion;
receive, via the second mailbox mechanism, a second request from the second processor for a second cryptographic key usable to decrypt the second encrypted portion; and
in response to the first and second requests, provide the first and second cryptographic keys to the cryptographic circuit.

13. The integrated circuit of claim 12, wherein the secure circuit is configured to:
receive the first request during a boot strapping process of the first operating system executable by the first processor; and
provide the first cryptographic key to the memory controller, wherein the memory controller includes the cryptographic circuit; and
wherein the memory controller is configured to decrypt the first encrypted portion with the first cryptographic key.

14. The integrated circuit of claim 13, wherein the secure circuit is configured to:
receive an indication that the first operating system is being shut down; and
instruct the memory controller to discontinue use of the first cryptographic key.

15. The integrated circuit of claim 12, wherein the secure circuit includes:
a third processor; and
memory having a first application and a second application stored therein;
wherein the first application is executable by the third processor to:
service requests received via the first mailbox mechanism, including causing the secure circuit to provide the first cryptographic key responsive to the first request; and
wherein the second application is executable by the third processor to:
service requests received via the second mailbox mechanism, including causing the secure circuit to provide the second cryptographic key responsive to the second request.

16. The integrated circuit of claim 12, wherein the integrated circuit is a system on a chip (SoC).

17. A method, comprising:
a secure circuit of a computing device receiving, via a first mailbox mechanism of the secure circuit, a first request from a first processor for a first cryptographic key;
the secure circuit receiving, via a second mailbox mechanism of the secure circuit, a second request from a second processor for a second cryptographic key;
the secure circuit providing the first cryptographic key and the second cryptographic key to a memory controller, wherein the first cryptographic key is usable by the memory controller to decrypt a first operating system executable by the first processor, and wherein the second cryptographic key is usable by the memory controller to decrypt a second operating system executable by the second processor;
the secure circuit receiving an indication that the first operating system is being shut down; and
in response to the indication, the secure circuit instructing the memory controller to discontinue use of the first cryptographic key, wherein the memory controller is configured to use the second cryptographic key while the first operating system is shut down.

18. The method of claim 17, wherein the first request is received in conjunction with a boot process of the first operating system.

19. The method of claim 17, further comprising:
the secure circuit reading an encrypted version of the first cryptographic key from a memory of the computing device;
the secure circuit deriving a decryption key based on a passcode supplied by a user; and the secure circuit decrypting the encrypted version of the first cryptographic key with the decryption key to provide the first cryptographic key to the memory controller.

* * * * *